United States Patent [19]

Shimoda et al.

[11] Patent Number: 4,793,693

[45] Date of Patent: Dec. 27, 1988

[54] FERRO-ELECTRIC LIQUID CRYSTAL ELECTRO-OPTICAL DEVICE HAVING A DRIVE VOLTAGE WITH DC AND CHOPPING COMPONENTS

[75] Inventors: Sadashi Shimoda; Takamasa Harada; Masaaki Taguchi; Kokichi Ito, all of Tokyo, Japan

[73] Assignee: Seiko Instruments, Inc., Tokyo, Japan

[21] Appl. No.: 20,694

[22] Filed: Mar. 2, 1987

[51] Int. Cl.[4] .................................................. G02F 1/13

[52] U.S. Cl. ................................ 350/350 S; 350/333; 340/765; 340/805

[58] Field of Search ............................ 350/333, 350 S; 340/765, 784, 805

[56] References Cited

U.S. PATENT DOCUMENTS 4,701,026 10/1987 Yazaki et al. ............... 350/350 S X

*Primary Examiner*—Stanley D. Miller

*Assistant Examiner*—Richard F. Gallivan

*Attorney, Agent, or Firm*—Bruce L. Adams; Van C. Wilks

[57] ABSTRACT

A ferro-electric crystal electro-optical device which uses switching between bi-stable states of ferro-electric liquid crystal molecules. A change from one of the stable states to the other is effected by applying a selected voltage having a combination of chopping pulse to which the liquid crystal molecules are not responsive and DC pulse to which the liquid crystal molecules are responsive.

16 Claims, 6 Drawing Sheets

(D1) BRIGHT
(D2) DARK
(D3) NON-SELECT
(D4) NON-SELECT
2V1
OV
V1
-V1
-2V1

(a) C1 STROBE
(b) C2 STROBE
(c) S1 SIGNAL
(d) S2 SIGNAL

S1
S2
D1
D2
D3
D4
C1
C2

FERRO-ELECTRIC LIQUID CRYSTAL ELECTRO-OPTICAL DEVICE HAVING A DRIVE VOLTAGE WITH DC AND CHOPPING COMPONENTS

BACKGROUND OF THE INVENTION

This invention relates to a device, e.g., a display device, an electro-optical shutter for a printer or the like fort effecting electro-optical conversion by utilizing spontaneous polarization of a ferro-electric liquid crystal and its negative dielectric anisotropy.

Electro-optical conversion devices which utilize the spontaneous polarization of ferro-electric liquid crystal and its negative dielectric anisotropy have been known in the art to this date such as the device disclosed in Japanese Patent Laid-Open No. 176097/1985.

FIG. 2 of the accompanying drawings is a perspective view of a conventional ferro-electric liquid crystal cell (which will be hereinafter referred to as a "liquid crystal cell"). Reference numeral 1, 1 represents a pair of transparent glass substrates that are arranged to face each other. Reference numeral 2, 2 represents an alignment membrane which is oriented uniaxially and horizontally, and is disposed on an inner flat surface of the substrate 1. A rubbing film of polyimide, for example, is used as the alignment membrane. The rubbing direction of the pair of alignment membranes is substantially parallel. Reference numeral 3 represents a ferro-electric liquid crystal such as a chiral smectic liquid crystal (which will be hereinafter referred to as "SmC*". It has spontaneous polarization in a direction othogonal to the major axis of the liquid crystal molecule (hereinafter referred to as a "molecular axis"). Here, those liquid crystals which has negative dielectric anisotropy $\Delta\epsilon$ above at least a predetermined frequency are particularly selected as the ferro-electric liquid crystal. That $\Delta\epsilon$ is below 0 ($\Delta\epsilon<0$) means that dielectric polarization occurs in a direction orthogonal to the molecular axis due to an external electric field having a predetermined frequency range. The molecules of SmC* 3 are sandwiched between the substrates 1 and 1, exhibit horizontal alignment by the influence of the alignment membranes 2 and 2 as shown in the drawing and form a layer. Reference numerals 4 and 5 represents a pair of electrodes which are arranged to face each other in order to clamp the SmC* 3 membrane between them and to apply a driving voltage.

FIG. 3 is a driving waveform diagram of a conventional liquid crystal cell. A first DC pulse having a positive polarity is applied between the electrodes 4 and 5. However, the electrode 4 is kept at $\theta$ ground potential. Then, the liquid crystal molecules are aligned in such a fashion that the spontaneous polarization 6 of each liquid crystal molecule is arranged to a position perpendicular to the electrode 4 (see FIG. 2). This is the first stable state 7, under which the molecular axis is inclined by $+\theta$ with respect to the normal 8 of the SmC* layer. Next, when an AC pulse is applied, dielectric polarization occurs in a direction perpendicular to the molecular long axis because the liquid crystal molecule has negative dielectric anisotropy, and the first stable state is maintained and fixed by dielectric torque. When a second DC pulse having a negative polarity is further applied between the electrodes 4 and 5, the liquid crystal molecule is responsive to this pulse and the spontaneous polarization 6 of each liquid crystal molecule is aligned in a state where it faces pependicularly the electrode 5. This is the second stable state 9, where the molecular axis is inclined by $-\theta$ relative to the normal 8 of the SmC* layer (see FIG. 2). Thereafter, when an AC pulse is applied, this second stable state is maintained. Namely, the first stable state is written by the positive DC pulse, the second stable state is written by the negative DC pulse and the stable state is maintained by the AC pulse.

Turning back again to FIG. 2, reference numeral 10, 10 represents a pair of polarizations whose polarization axes cross each other at right angles. They clamp the SmC* membrane 3 and optically discriminate between the liquid crystal domain under the first stable state and the liquid crystal domain under the second stable state by utilizing birefringence. For instance, the first stable state is discriminated as a light cut-off state (hereinafter referred to as "black") and the second stable state, as a light transmission state (hereinafter referred to as "white").

The prior art reference already described discloses that the electrode arangement of the liquid crystal cell is of a matrix structure type such as shown in FIG. 4 and the scanning electrode group 4 (hereinafter referred to as "segment") and the signal electrode group 5 (hereinafter referred to as "common") are arranged to face one another. However, this reference does not disclose a driving waveform and a drive circuit for actually effecting line sequential driving. It is not possible to effect matrix driving by the waveform shown in FIG. 3.

SUMMARY OF THE INVENTION

It is therefore an object of the invention to provide an improved ferro-electric liquid crystal electro-optical device with a drive circuit for matrix-driving.

Another object of the invention is to provide an improved electro-optical device using spontaneous polarization of a ferro-electric liquid crystal and its negative dielectric anisotropy.

A further object of the invention is to provide a ferro-electric liquid crystal electro-optical device having a drive circuit which can write both bright (white) and dark (black) by one line sequential scanning.

DETAILED DESCRIPTION OF THE INVENTION

In an electro-optical conversion device of the type which selectively aligns liquid crystal molecules in a first stable state or a second stable state by utilizing the spontaneous polarization of ferro-electric liquid crystal molecules and keeps each of these stable state by utilizing the negative dielectric anisotropy of the ferro-electric liquid crystal, the present invention produces an impressed voltage for producing each stable state by the combination of chopping pulse portions to which the liquid crystal molecules are not responsive and DC pulse portions to which they are responsive, and arranges these DC pulse portions so that their phases do not overlap with each other between the impressed voltage for producing the first stable state and the impressed voltage for producing the second stable state. Therefore, when line sequential driving is carried out in an electro-optical device having a matrix electrode arrangement, the first stable state and the second stable state can be written simultaneously into each matrix pixel a one line sequential scanning operation.

The present invention will be described with reference to FIG. 1.

Figures 1A, 1B, 1C:
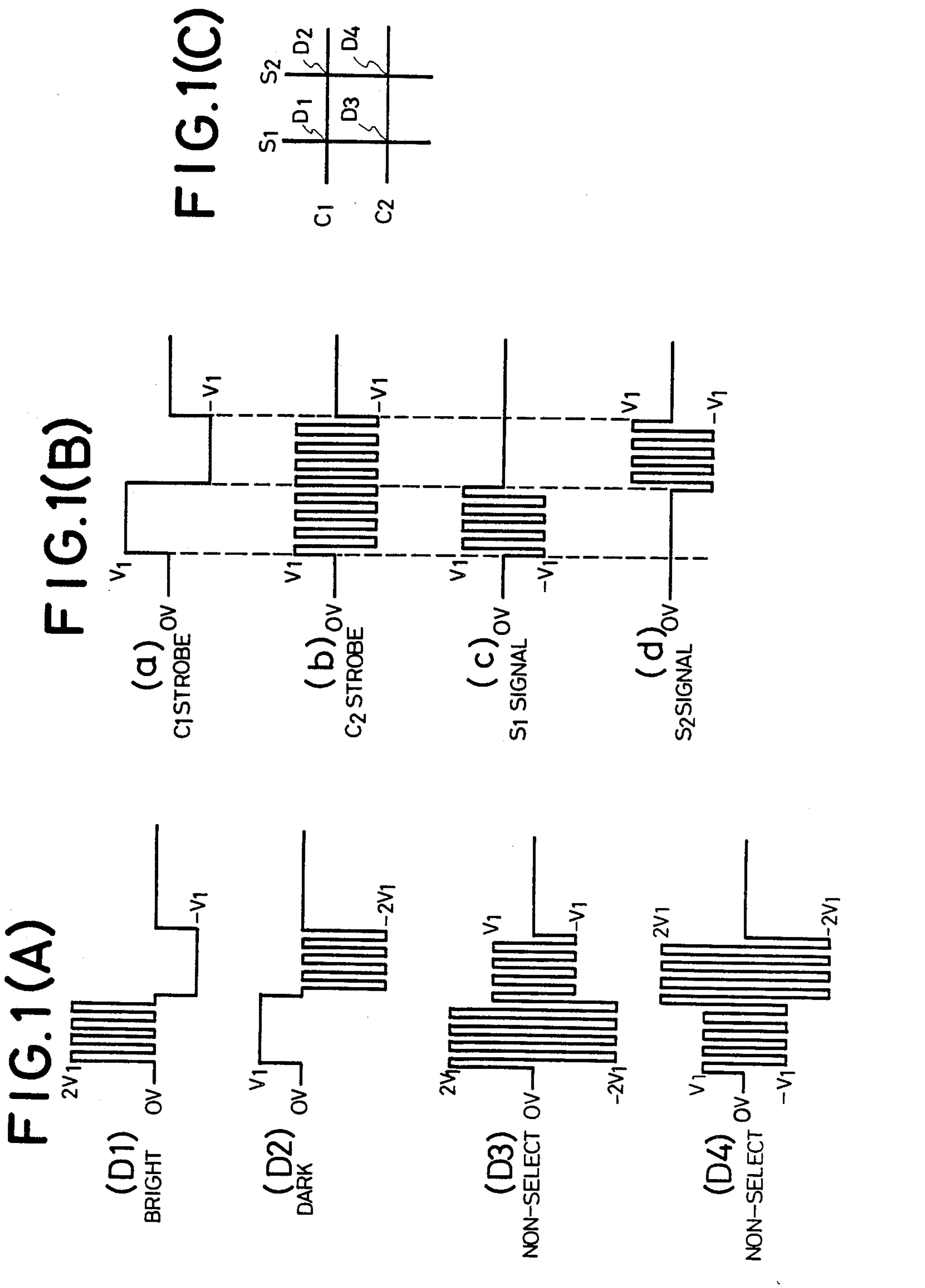
FIG. 1(A) is a waveform diagram of waveforms applied to matrix dots.
FIG. 1(B) is a waveform diagram of waveforms applied to commons (strobes) and segments (signals)
FIG. 1(C) shows a matrix electrode structure.
Figure 2:
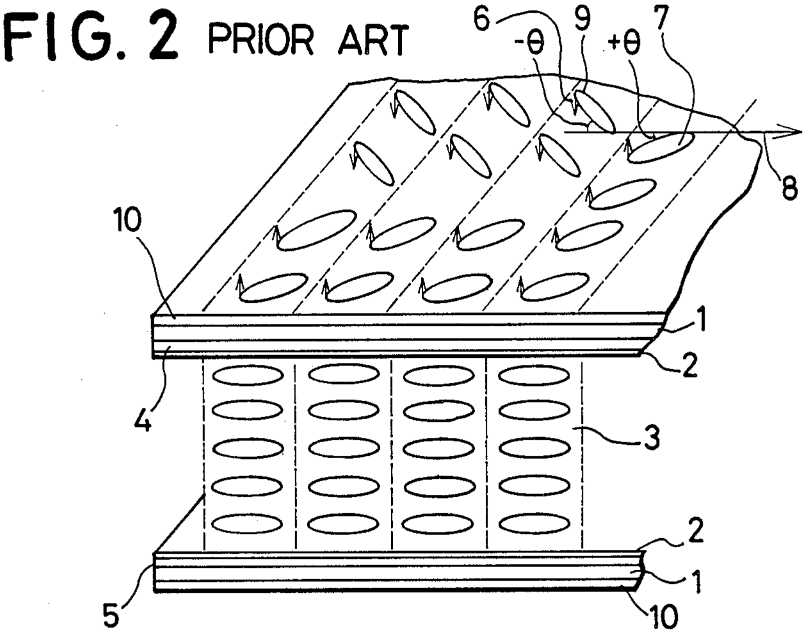
FIG. 2 PRIOR ART
FIG. 2 is a perspective view of a conventional liquid crystal cell.
Figure 3:
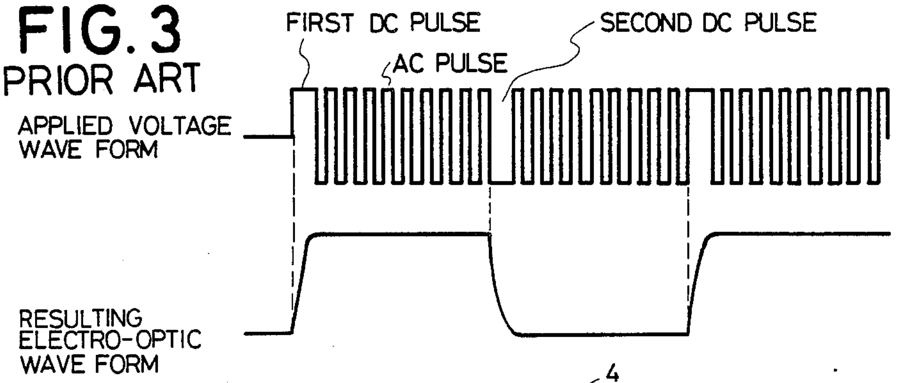
FIG. 3 PRIOR ART
FIG. 3 is an operating waveform diagram of the conventional liquid crystal cell.
Figure 4:
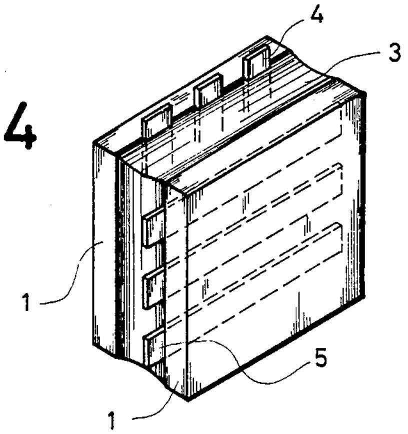
FIG. 4 shows the arrangement of electrodes of a liquid crystal cell.

FIG. 1(C) shows a matrix electrode construction of the liquid crystal cell. Two segments (signals) $S_1$, $S_2$ and two commons (strobes) $C_1$, $C_2$ are arranged in such a manner as to form four matrix pixels (hereinafter referred to as "dots") $D_1$ through $D_4$. The rest of the construction of the liquid crystal cell are the same as those shown in FIGS. 2 and 4.

FIG. 1(A) shows the waveform applied to each dot. This example shows the waveform for selecting the common $C_1$ by line sequential scanning and for writing simultaneously white and black to the dots $D_1$ and $D_2$ on the common $C_1$. A waveform which keeps the previous state is applied to the dots $D_3$ and $D_4$ on the nonselected common $C_2$.

A chopped positive pulse is applied to the dot $D_1$ in the former half period of the selection period and a negative DC pulse, in the latter half period. The SmC* molecules do not respond to the chopping pulses but do to the negative DC pulses so that white (second stable state) is written into the dot $D_1$.

A positive DC pulse is applied to the dot $D_2$ in the former half period of the selection period and a negative chopping pulse, in the latter half period. The SmC* molecules respond to the positive DC pulse in the former half period and black (first stable state) is written into the dot $D_2$. The do not respond to the chopping pulse in the latter half period.

As described above, the selection period is divided into two periods so that the former and latter halves are utilized for writing black and white on the time division basis, respectively, and white and black are written simultaneously by one scanning operation. In this case, the invention utilizes the phenomenon that the SmC* molecules do not respond to the chopping pulse, and the explanation of this phenomenon will be made in the item "Action" of the invention.

The AC pulse is applied to the unselected dots $D_3$ and $D_4$ and the state already written into $D_3$ and $D_4$ is maintained by the dielectric torque based upon $\Delta\epsilon<0$.

When the scanning operation is made linesequentially for a large number of commons and segments (or in other words, when the commons are scanned), re-write of the picture surface can be made by one frame.

FIG. 1(B) shows the waveforms applied to the segments and commons in order to generate the driving waveforms to be applied to the dots $D_1$ through $D_4$ shown in FIG. 1(A). Symbol (α) represents a common selection signal applied to the common $C_1$, (b) is a common nonselection signal applied to the common $C_2$, (c) is a white write signal applied to the segment $S_1$ and (d) is a black write signal applied to the segment $S_2$. Incidentially, a definite circuit for generating these common and segment signals will be explained in the item "Embodiment".

Figure 5:
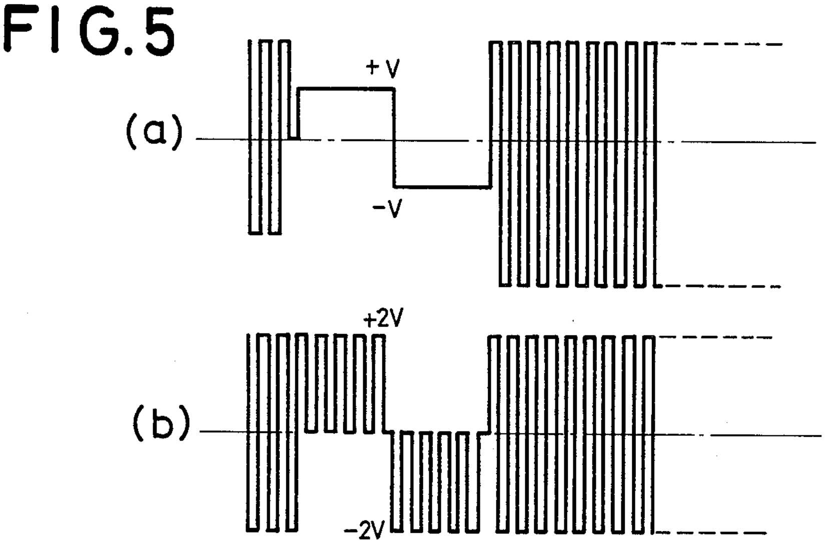
FIG. 5 is a test waveform diagram useful for explaining the operation.

The phenomenon that the SmC* molecules do not respond to the chopping pulse but do to the DC pulse will be explained. FIG. 5 shows test pulses applied to a certain dot in the liquid crystal cell shown in FIGS. 2 and 4. Symbol (a) represents pulses wherein DC pulses having a positive polarity and a peak value +V and DC pulses having a negative polarity and a peak value −V continue within the selection period (3 msec). The display state changes from black to white). Symbol (b) represents a waveform which applies chopping pulses having a peak value +2V in the former half of the selection period and chopping pulses having a peak value −2V in the latter half.

Figure 6:
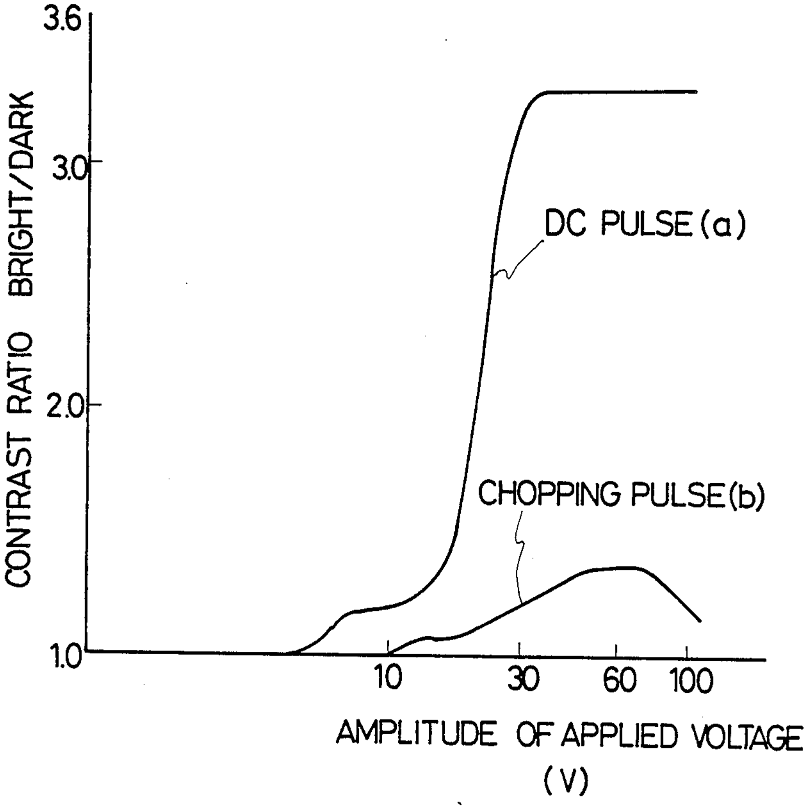
FIG. 6 is a contract ratio-v-impressed voltage characteristic diagram useful for explaining the operation.

FIG. 6 is a diagram obtained by examining the contrast ratio when black changes to white during the selection period at each voltage level while the waveforms a and b are applied with a varying voltage V. In the case of the DC pulse a, a large contrast ratio can be obtained at about 30V or more. In ther words, the SmC* molecules shift completely from the first stable state to the second stable state at a threshold value of at least 30V.

In the case of the hopping pulse b, however, the change of the contrast is small even when a pulse having an amplitude of 60V is applied, and it can be understood that the SmC* molecules do not completely shift from the first stable state to the second stable state. This can be explained in the following way. The properties contributing to the reversion mechanism of the SmC* molecules are believed to be spontaneous polarization and dielectric torque. The spontaneous polarization torque always acts in such a fashion that the spontaneous polarization is in parallel with the direction of electric field, irrespective of the polarity of $\Delta\epsilon$. In the case of the latter, that is, the dielectric torque, however, it acts in such a fashion that the long axis of molecules are perpendicular to the electric field in the case of the SmC* liquid crystal having $\Delta\epsilon<0$. In other words, in the system where $\Delta\epsilon<0$, the spontaneous polarization torque (which acts in such a fashion that at the initial state where the molecules are about to shift from the first stable state to the second stable state, the long axis of molecules are in parallel with the electric field) and the dielectric torque act in the opposite directions to each other. Therefore, in the system where $\Delta\epsilon<0$, response is believed to be slower than in the system where $\Delta\epsilon<0$. This dielectric torque is proportional to an effective voltage (rms value of voltage). The effective voltage of the chopping pulse is $\sqrt{2}\,V_1$ while that of the DC pulse is $V_1$ and the former is greater by $\sqrt{2}$ than the latter and acts more strongly by $\sqrt{2}$ times than the latter. Therefore, response of the chopping pulse is slower than that of the DC pulse and when measurement is made with a predetermined pulse width such as shown in FIG. 6, the molecules cannot completely shift from the first stable state to the second stable state and hence, the contrast ratio remains small.

Incidentially, the SmC* liquid crystal used for measurement is Type 3234 of Merck Co having $\Delta\epsilon$of −2.4.

Figure 7:
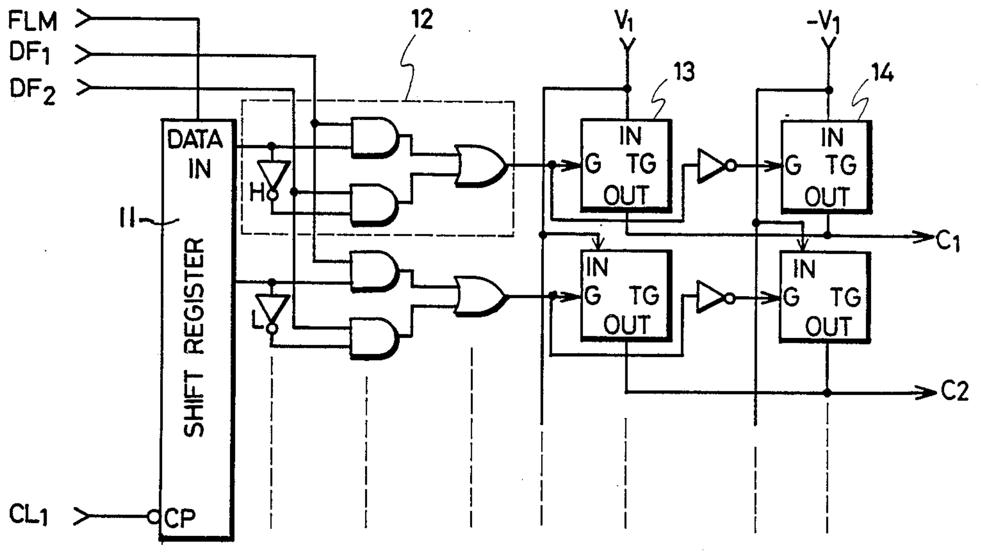
FIG. 7 is a strobe electrode drive circuit diagram.
Figure 9:
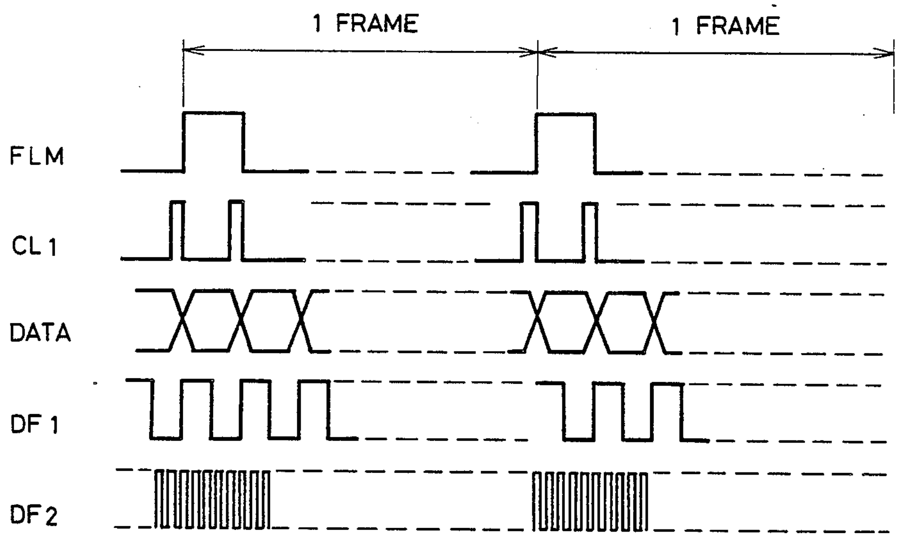
FIG. 9 is a time chart for a strobe and signal electrode drive circuit.

FIG. 7 shows a common (strobe) drive circuit for generating the common selection signal (a) and the common non-selection signal (b) shown in FIG. 1(B). As can be understood from FIG. 1(B), the necessary voltage levels are $+V_1$ and $-V_1$ and the necessary signals for making AC are $DF_1$ for halving the selection period into the former half and the latter half and $DF_2$ for generating a necessary high frequency for holding the stable state. (Refer to the time chart of FIG. 9.) Incidentially, $DF_2$ is also used for chopping. Reference numeral 11 represents a shift register, which receives a signal FLM for designating the selection period and a common shift pulse $CL_1$ for distributing line-sequentially FLM to each common. The output of the shift register 11 is connected to a gate group 12. The gate group 12 receives $DF_1$ and $DF_2$ and its output controls transmission gates 13 and 14. The input of the transmission gate 13 is at the $+V_1$ potential and its output is applied to each common. The input of the transmission gate 14 is at the $-V_1$ potential, and its output is applied to each common.

When the output of the shift register 12 is HIGH, the gate group 12 receives $DF_1$ and renders the transmission gate 13 conductive in the former half and the transmission gate 14 conductive in the latter half. As a result, the common selection signal represented by ($\alpha$) in FIG. 1(B) appears at the output of the common $C_1$. When the output of the shift register 12 is LOW, on the other hand, the gate group 12 receives $DF_2$ and outputs the AC pulse oscillating between $+V_1$ and $-V_1$ in synchronism with $DF_2$ to the common $C_2$. This is the common non-selection signal represented by (b) in FIG. 1(B).

Figure 8:
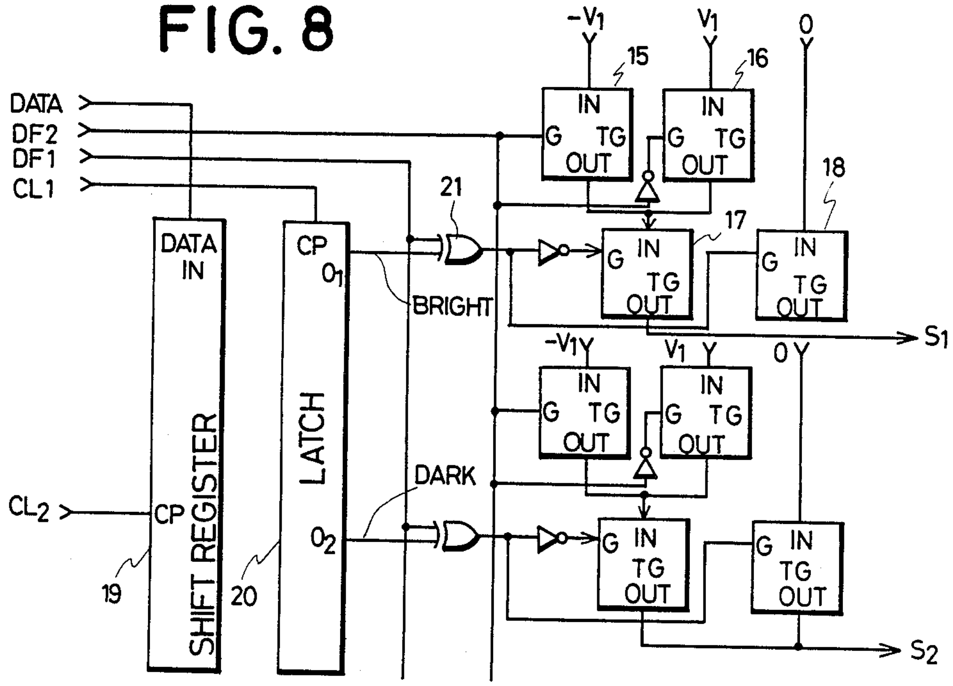
FIG. 8 is a signal electrode drive circuit diagram.

FIG. 8 shows a signal drive circuit for generating the white write pulses (c) and the black write pulses (d) to be applied to the signal line. As can be seen in FIG. 1(B), the necessary voltage levels are three, that is, $+V_1$, 0 and $-V_1$, which are supplied to the signal line through the transmission gates 15, 16, 17 and 18. The signals for making AC for the ON-OFF control of each gate are $DF_1$ and $DF_2$. Reference numeral 19 represents a shift register. Serial video data DATA are read and stored by a high speed clock $CL_2$. Reference numeral 20 represents a latch circuit, which latches the video data applied in parallel by the shift register 19, in synchronism with the clock $CL_1$, and outputs the white or black information in accordance with the line sequential timing $CL_1$. Reference numeral 21 represents a gate, which is controlled by the output of the latch circuit 20, receive $DF_1$ and $DF_2$ as the input signal and produces the output which makes the ON-OFF control of each transmission gate. As described already, the output of each transmission gate is applied to each segment.

When the data appearing at the output terminal $O_1$ of the latch circuit 20 is white (or HIGH), the gate 21 turns ON the transmission gate 17 and outputs the high frequency, which is obtained by alternatingly turning ON and OFF the transmission gates 15 and 16 by $DF_2$ and oscillates between $+V_1$ and $-V_1$, to the segments $S_1$ in the former half of the selection period and turns ON the transmission gate 18 and outputs the O level potential in the latter half of the selection period. Thus, the white write signal represented by (c) in FIG. 1(B) can be obtained at $S_1$. When the data appearing at the output terminal $O_2$ of the latch circuit 20 is black (or LOW), the gate 21 similarly outputs the O level potential to the segment $S_2$ in the former half of the selection period and the high frequency oscillating between $+V_1$ and $-V_1$ in the later half. Thus, the black write signal represented by (d) in FIG. 1(B) can be obtained.

Figure 10:
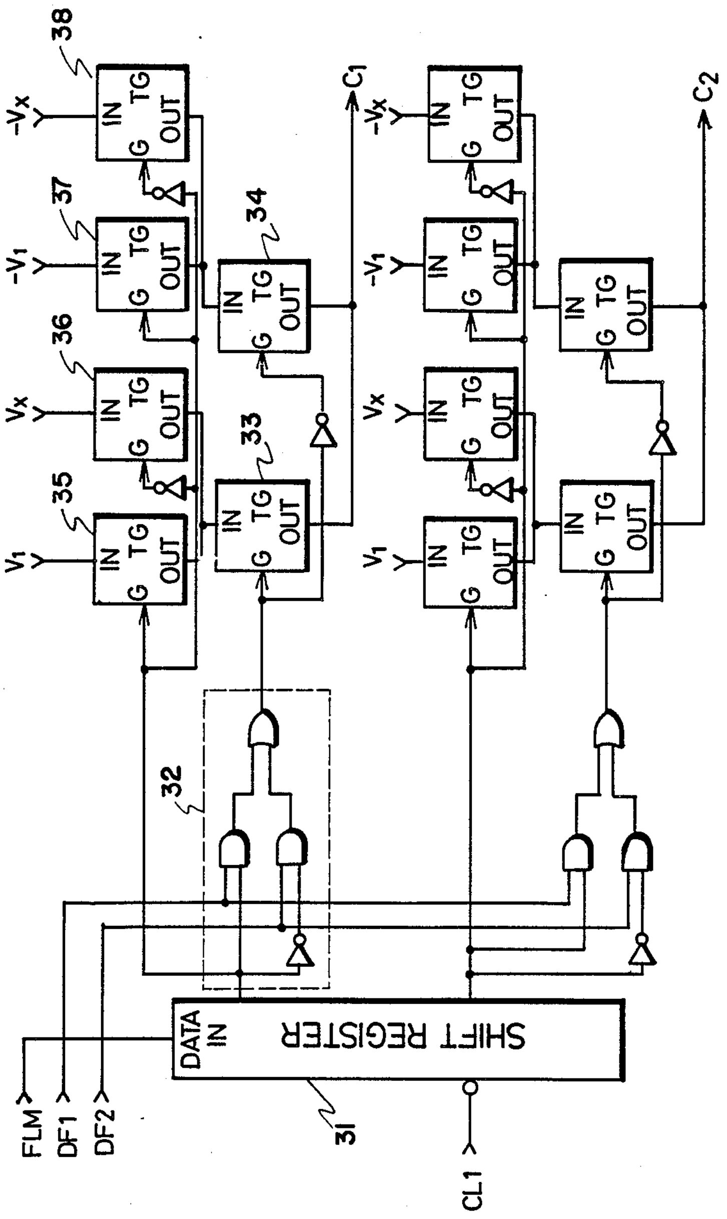
FIG. 10 shows an embodiment of a strobe electrode drive circuit generating non-selecting strobe pulses with a desired amplitude as shown in (b) of FIG. 1(B).

FIG. 10 shows an embodiment of a common (strobe) electrode drive circuit generating non-selecting strobe pulses (b) as shown in FIG. 1(B) having a desired amplitude. Reference numeral 31 is a shift register clocked by CL1 and having FLM as the data input. Gates 32 are used with signals DF1 and DF2 to produce an output fed to gates 33–38. The dielectric torque given to ferro-electric liquid crystal molecules depends on amplitude of applied voltage, applied time and dielectric anisotropy value of the liquid crystal. Larger amplitude of applied voltage, longer applied time or larger absolute value of dielectric anisotropy $\Delta\epsilon$ generates stronger dielectric torque. The $\Delta\epsilon$ varies according to the kind of SmC* compound, ambient temperature or the else. Therefore, in order to give necessary torque to the ferro-electric liquid crystal molecules for obtaining high contrast, it is necessary to control the amplitude of non-selecting strobe pulses (b). In FIG. 10, by setting Vx to a proper value, it is possible to obtain non-selecting strobe pulses (b) with a desired amplitude.

In an electro-optical device for writing two black and white optical state by utilizing spontaneous polarization of the SmC* molecules and their negative dielectric anisotropy, the present invention employs the matrix type as the electrode structure, divides to selection period into the former and later halves on the time division basis for line sequential driving and uses the former half for a first stable state and the latter for a second stable state. Therefore, according to the invention, it is possible rewrite the picture by one frame and to operate at a high speed. Therefore, the present invention is suitable for moving pictures.

What is claimed is:

1. A ferro-electric liquid crystal electro-optical device switchable between bi-stable states of ferro-electric liquid crystal molecules, comprising: means for effecting a change from one of the stable states to the other including means for applying a selected signal having a first portion and a second portion, wherein one of the first and second portions comprises a DC pulse of one polarity effective to change the molecules from one stable state to the other, and the other of the first and second portions comprises a chopping pulse of the opposite polarity ineffective to change the stable state of the molecules.

2. An electro-optical device as claimed in claim 1; wherein the device has a dot-matrix electrode construction comprising plural scanning electrodes and plural signal electrodes.

3. An electro-optical device as claimed in claim 2; including means for selectively applying a selected signal for effecting the change of one of the stable states of the liquid crystal molecules to the other state and a selected signal for effecting the change of the other of the stable states to the one state to display pixels on a selected scanning line.

4. An electro-optical device as claimed in claim 2; including a driver operative to change the amplitude of a nonselected signal applied to display pixels on a non-selected scanning line.

5. An electro-optical device as claimed in claim 4; including means for setting the amplitude of the non-selected signal so that the liquid crystal molecules are substantially parallel to substrates sandwiching the liquid crystal.

6. An electro-optical device as claimed in claim 5; wherein the ferro-electric liquid crystal molecules exhibit negative dielectric anisotropy.

7. An electro-optical device as claimed in claim 1; including means for applying a non-selected signal having a high frequency without DC component to display pixels on a non-selected scanning line.

8. An electro-optical device as claimed in claim 1; wherein said chopping pulse is twice the amplitude of said DC pulse.

9. An electro-optical device as claimed in claim 1; wherein each of the first and second portions of the selected signal has an approximately equal time width.

10. A ferro-electric liquid crystal electro-optical device switchable between bi-stable states of ferro-electric liquid crystal molecules, comprising:means for producing a first selected signal having a combination of a chopping pulse in a front park and a DC pulse in a rear part and for applying same to a display pixel to get one of the bi-stable states; and means for producing a second selected signal having a combination of a DC pulse in the front part and a chopping pulse in the rear part and for applying same to a display pixel to get the other of the bi-stable states.

11. An electro-optical device as claimed in claim 10; wherein the device has a dot-matrix electrode construction comprising plural scanning electrodes and plural signal electrodes.

12. An electro-optical device as claimed in claim 10; including means for selectively applying the first and second selected signals to display pixels on a selected scanning line.

13. An electro-optical device as claimed in claim 10; wherein each of the chopping pulse and DC pulse of the first selected signal has a polarity opposite to each of the chopping pulse and the DC pulse of the second selected signal.

14. An electro-optical device as claimed in claim 10; wherein the chopping pulse of the first and second selected signals is twice the amplitude of said DC pulse.

15. an electro-optical device as claimed in claim 10; wherein said chopping pulse has a high frequency under which the ferro-electric liquid crystal molecules exhibit negative dielectric anisotropy.

16. An electro-optical device as claimed in claim 10; wherein each of the front and rear parts of the first and second selected signals has an approximately equal time width.

* * * * *